(12) United States Patent
Fujimoto et al.

(10) Patent No.: US 12,530,237 B2
(45) Date of Patent: Jan. 20, 2026

(54) DEVICE, SYSTEM, METHOD, AND COMPUTER PROGRAM PRODUCT FOR DYNAMIC WORKLOAD OFFLOADING AND ACCELERATOR ALLOCATION

(71) Applicant: NTT, Inc., Tokyo (JP)

(72) Inventors: Kei Fujimoto, Musashino (JP); Shogo Saito, Musashino (JP); Tetsuro Nakamura, Musashino (JP)

(73) Assignee: NTT, Inc., Tokyo (JP)

( * ) Notice: Subject to any disclaimer, the term of this patent is extended or adjusted under 35 U.S.C. 154(b) by 423 days.

(21) Appl. No.: 18/026,262

(22) PCT Filed: Sep. 17, 2020

(86) PCT No.: PCT/JP2020/035172
§ 371 (c)(1),
(2) Date: Mar. 14, 2023

(87) PCT Pub. No.: WO2022/059112
PCT Pub. Date: Mar. 24, 2022

(65) Prior Publication Data
US 2023/0359501 A1    Nov. 9, 2023

(51) Int. Cl.
G06F 9/50        (2006.01)

(52) U.S. Cl.
CPC .......... *G06F 9/5044* (2013.01); *G06F 9/5083* (2013.01); *G06F 2209/509* (2013.01)

(58) Field of Classification Search
CPC . G06F 9/5044; G06F 9/5083; G06F 2209/509
See application file for complete search history.

(56) References Cited

U.S. PATENT DOCUMENTS 11,042,413 B1 *   6/2021  Byagowi .............. G06F 9/5027
2012/0246214 A1   9/2012  Ogawa et al.
(Continued)

FOREIGN PATENT DOCUMENTS

JP    2013045219    3/2013
JP    2017147488    8/2017
WO    WO 2011/052102    5/2011

OTHER PUBLICATIONS

Weerasinghe et al., "Enabling FPGAs in Hyperscale Data Centers," 2015 IEEE 12th Intl Conf on Ubiquitous Intelligence and Computing, Aug. 14, 2015, pp. 1078-1086.
(Continued)

*Primary Examiner* — Jorge A Chu Joy-Davila
(74) *Attorney, Agent, or Firm* — Fish & Richardson P.C.

(57) ABSTRACT

A management device of an accelerator management mechanism includes a workload management unit that manages correspondence information that associates each workload with an accelerator of a calculation node that may support the workload, and an accelerator management unit that receives an inquiry about a workload from a user terminal, acquires information of an accelerator of a calculation node that may support the workload of the inquiry with reference to the correspondence information, responds to the user terminal with the acquired information, and thereby offloads the workload of the inquiry from the user terminal to the accelerator of the calculation node for which the response has been made.

9 Claims, 14 Drawing Sheets

(56) References Cited

U.S. PATENT DOCUMENTS

2018/0307499 A1* 10/2018 Chen .................. G06F 15/76
2019/0042329 A1* 2/2019 Kakaiya .............. G06F 9/5088
2019/0065284 A1* 2/2019 Sardino ............... G06F 9/5027

OTHER PUBLICATIONS

Chen et al., "Enabling FPGAs in the Cloud," CF '14: Proceedings of the 11th ACM Conference on Computing Frontiers, May 22, 2014, pp. 1-10.

* cited by examiner

FIG. 6

| ACCELERATOR | FPGA CIRCUIT | ADDRESS | LOCATION | IDENTIFIER | USAGE STATUS (PERIOD) |
|---|---|---|---|---|---|
| GPU | — | x.x.x.x | P11 | yyyyyyy | IN USE (xx TO xx) |
| TPU | — | x.x.x.x | P12 | yyyyyyy | AVAILABLE |
| FPGA | IMAGE EDGE DETECTION | x.x.x.x | P13 | yyyyyyy | IN USE (xx TO xx) |
| FPGA | AUDIO CODEC TRANSFORMATION | x.x.x.x | P14 | yyyyyyy | IN USE (xx TO xx) |
| FPGA | OBJECT IDENTIFICATION | x.x.x.x | P15 | yyyyyyy | IN USE (xx TO xx) |

FIG. 7

| RANKING | WORKLOAD | NUMBER OF CASES |
|---------|----------|-----------------|
| FIRST | IMAGE EDGE DETECTION | 100 |
| SECOND | OBJECT IDENTIFICATION | 91 |
| THIRD | AUDIO CODEC TRANSFORMATION | 82 |
| FOURTH | AUDIO FOURIER TRANSFORMATION | 73 |
| FIFTH | VOICE RECOGNITION | 64 |
| SIXTH | VIDEO CODEC TRANSFORMATION | 55 |

| RANKING | WORKLOAD | NUMBER OF CASES | NUMBER OF ACCELERATORS | USAGE RATE |
|---|---|---|---|---|
| FIRST | IMAGE EDGE DETECTION | 100 | xx | yy% |
| SECOND | OBJECT IDENTIFICATION | 91 | xx | yy% |
| THIRD | AUDIO CODEC TRANSFORMATION | 82 | xx | yy% |
| FOURTH | AUDIO FOURIER TRANSFORMATION | 73 | xx | yy% |
| FIFTH | VOICE RECOGNITION | 64 | xx | yy% |
| SIXTH | VIDEO CODEC TRANSFORMATION | 55 | xx | yy% |

DEVICE, SYSTEM, METHOD, AND COMPUTER PROGRAM PRODUCT FOR DYNAMIC WORKLOAD OFFLOADING AND ACCELERATOR ALLOCATION

CROSS-REFERENCE TO RELATED APPLICATIONS

This application is a National Stage application under 35 U.S.C. § 371 of International Application No. PCT/JP2020/035172, having an International Filing Date of Sep. 17, 2020. The disclosure of the prior application is considered part of the disclosure of this application, and is incorporated by reference in its entirety into this application.

TECHNICAL FIELD

The disclosure relates to an accelerator management device, a communication system, an accelerator management method, and an accelerator management program.

BACKGROUND ART

Games, virtual reality (VR), augmented reality (AR), voice recognition, and the like are widely used as applications requiring large arithmetic processing and high real-time performance. Hardware for a specific application such as a graphics processing unit (GPU) designed to support these applications and perform graphic processing is utilized as an accelerator.

FIG. 12 is a configuration diagram illustrating a user terminal 40x that does not include an accelerator.

A general-purpose operation system (OS) 42x installed on general-purpose hardware 41x such as a central processing unit (CPU) and a random access memory (RAM) in a user terminal 40x operates an application as an application unit 43x. However, since it takes time for the CPU to perform graphic processing, smooth operation of the application unit 43x may not be possible.

FIG. 13 is a configuration diagram illustrating a user terminal 40y that includes a built-in accelerator.

A general-purpose OS 42y installed on hardware 41y of the user terminal 40y operates an application as an application unit 43y. Note that the user terminal 40y is a VR device equipped with a GPU. The application unit 43y causes an accelerator 44y (GPU) included in the hardware 41y to take charge of graphic processing.

Thus, the application unit 43y can be operated smoothly. However, power consumption of the GPU increases, and the lifetime of the battery decreases.

Patent Literature 1 describes a method utilizing an accelerator built into the user terminal 40y (an accelerator in a local environment) as illustrated in FIG. 13. Meanwhile, Patent Literature 2 describes a method utilizing an accelerator of a center server (an accelerator in a remote environment) via a public cloud. In Patent Literature 2, by management of a resource manager, hardware processing of an application installed on the center server is allocated to a field-programmable gate array (FPGA) that is an accelerator.

FIG. 14 is a configuration diagram illustrating a user terminal 40z that requests a center server having an accelerator to perform processing.

A general-purpose OS 72z installed on hardware 71z of a center server 70z operates an application as an application unit 73z. In the center server 70z, a GPU that is an accelerator 74z is included in the hardware 71z.

Thus, similarly to the accelerator in a local environment in FIG. 13, the accelerator in a remote environment in FIG. 14 is caused to take charge of the graphic processing, whereby the application unit 73z can be operated smoothly. Note that a communication delay may occur depending on a communication environment between the user terminal 40z and the center server 70z.

CITATION LIST

Patent Literature

Patent Literature 1: Japanese Unexamined Patent Application Publication No. 2017-147488 A
Patent Literature 2: Japanese Unexamined Patent Application Publication No. 2013-45219 A

SUMMARY

Technical Problem

In order to effectively utilize the performance of an accelerator, it is necessary for application developers to perform programming while being aware of a specific hardware configuration (type, number, installation location, and the like) of the accelerator.

However, the software vendor, the hardware vendor, and the network operator are generally separate operators. Therefore, application developers often do not know an execution environment of an accelerator that is provided by a hardware vendor or operated by a network operator.

In this way, a mechanism for supporting operation with respect to which task is allocated to which accelerator by an application is not provided in the case of an accelerator in a local environment according to Patent Literature 1 or in the case of an accelerator in a remote environment according to Patent Literature 2.

That is, in the related art, the development cost of an application utilizing an accelerator remains high.

Therefore, a main object of the disclosure is to support provision of an application utilizing an accelerator.

Solution to Problem

In order to solve the above problems, an accelerator management device of the disclosure includes the following features.

According to the disclosure, an accelerator management device includes: a workload management unit configured to manage correspondence information that associates each workload with an accelerator of a calculation node that may support the workload; and
   an accelerator management unit. The accelerator management unit is configured to receive an inquiry about a workload from a user terminal, acquire information of the accelerator of the calculation node that may support the workload of the inquiry with reference to the correspondence information, respond to the user terminal with the acquired information, and thereby offload the workload of the inquiry from the user terminal to the accelerator of the calculation node for which the response has been made.

Advantageous Effects

According to the disclosure, it is possible to support provision of an application that utilizes an accelerator.

BRIEF DESCRIPTION OF DRAWINGS

FIG. 6 is a table illustrating accelerator management information managed by an accelerator management unit according to an embodiment.

FIG. 7 is a table illustrating workload ranking information managed by a ranking management unit according to an embodiment.

FIG. 8 is a table illustrating correspondence information on a correspondence between a workload and an accelerator. The correspondence information is managed by a workload management unit according to an embodiment.

DESCRIPTION OF EMBODIMENTS

The terms used herein are defined below.

A video monitoring application (large unit) provides a video monitoring service by executing processing components such as a processing component that detects a person from a video and a processing component that tracks a detected person. The processing component (medium unit) is also referred to as a microservice.

Also, among the plurality of processing components included in the application, a processing component having a high frequency of actual execution is referred to as "frequent occurrence processing". That is, the frequent occurrence processing is a processing component that will benefit more from being speeded up compared to other processing components.

Furthermore, one processing component is composed of one or more workloads (small units). The workload is a unit of processing that an accelerator is delegated to perform (offloading). For example, a processing component that detects a person from a video of a camera includes the following four workloads:

(a) workload that retrieves frames from video,
(b) workload that detects edges (contours),
(c) workload that detects people by AI (artificial intelligence) inference or the like, and
(d) workload that identifies a person from the face of the detected person or the like.

Therefore, the effect of offloading a workload to an accelerator is greater when the workload is a more frequently used workload that is a component of the frequent occurrence processing.

Figure 1:
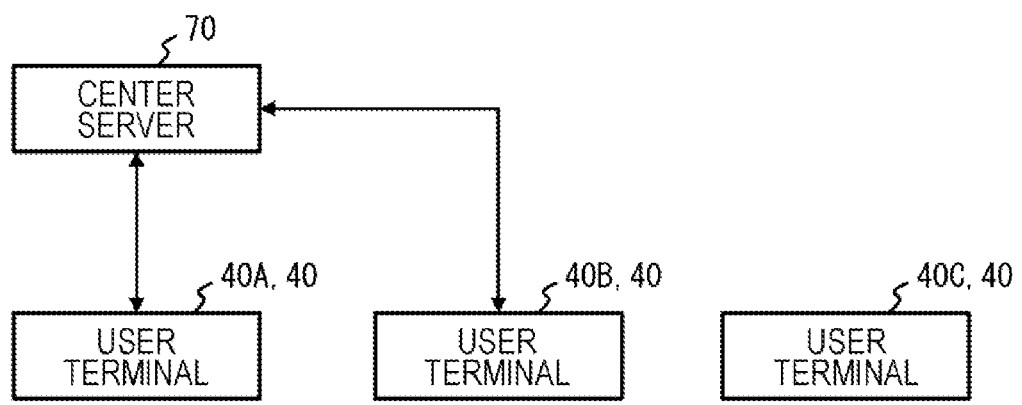
FIG. 1 is a configuration diagram of a communication system before offloading according to an embodiment is performed.

FIG. 1 is a configuration diagram of a communication system before offloading is performed.

Upon receiving a request from user terminals 40A and 40B, a center server 70 processes a workload involving a very large amount of data processing such as video processing, voice recognition, big data analysis, or deep learning with an accelerator in the center server 70.

The user terminal 40C processes a high-load workload such as a workload for a game, VR/AR, video processing, or voice recognition with its own accelerator.

In this way, an application that uses an accelerator operates on devices including a built-in accelerator, such as the center server 70 and user terminal 40C. Therefore, waste such as inability to effectively use an available accelerator occurs.

Figure 2:
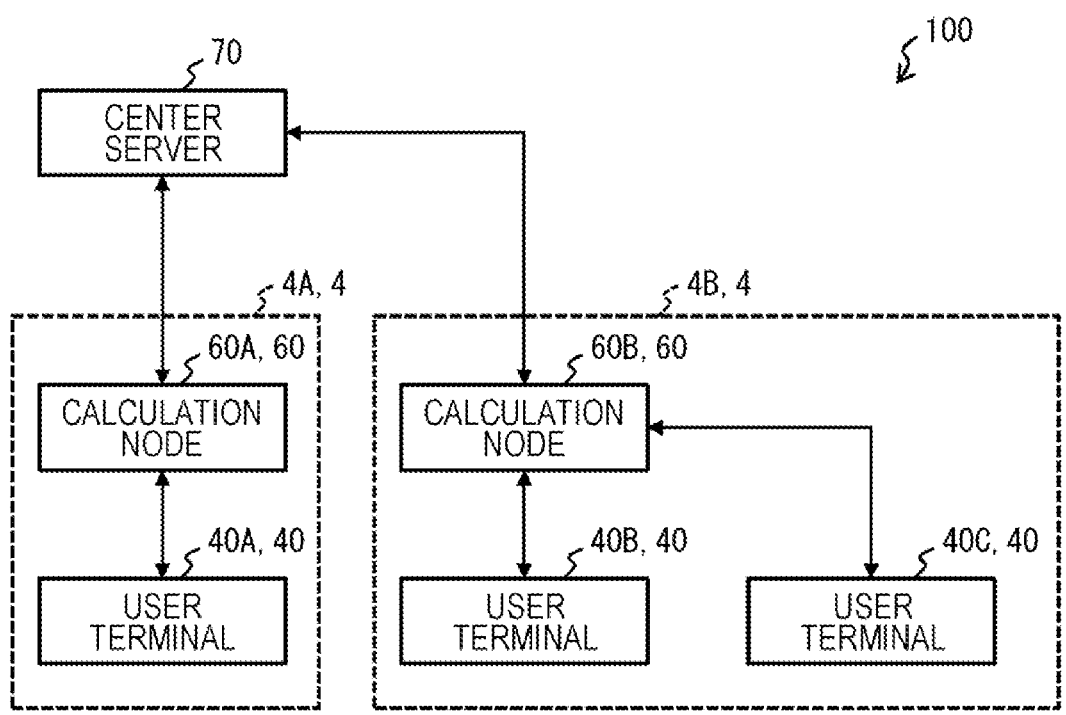
FIG. 2 is a configuration diagram of a communication system after offloading according to an embodiment.
Figure 2:
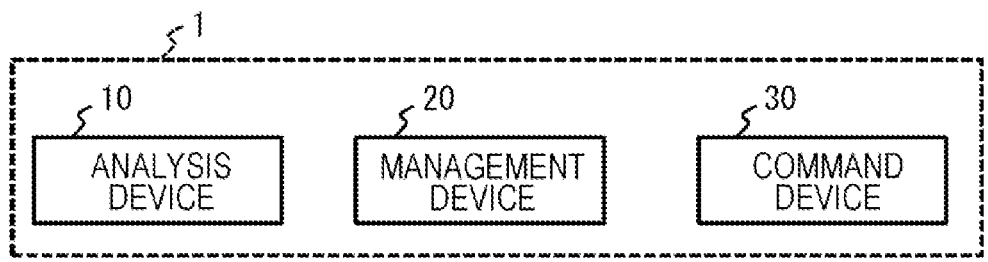

FIG. 2 is a configuration diagram of a communication system 100 after offloading.

In the communication system 100, a calculation node 60 that includes an accelerator is added to the center server 70 and the user terminal 40 of FIG. 1. An application is installed in each of the center server 70 and the user terminal 40. Then, the center server 70 and the user terminal 40 offload a workload required for the operation of an application to the calculation node 60 instead of to themselves.

Thus, even when an application requires large arithmetic processing exceeding the computation performance of the center server 70 or the user terminal 40 and high real-time performance, a computing system that satisfies the requirement can be constructed.

The user terminal 40C in FIG. 1 operates an accelerator included in the user terminal 40C itself. On the other hand, the user terminal 40C in FIG. 2 does not need to include an accelerator because of offloading to a calculation node 60B. This enables a service to be used even with a low-performance terminal. For example, advanced processing such as voice recognition followed by machine operation can be offloaded to the calculation node 60B when using a user terminal 40C of a small size such as an earphone.

In addition, since the user terminal 40C of FIG. 2 does not need to include an accelerator, it is possible to reduce power consumption and prolong battery duration.

According to one or more embodiments, the calculation node 60 is, like a regional data center (DC) or a mobile edge computing (MEC), deployed for each region 4 in which a user terminal 40 is present, so that an accelerator whose frequency of use is high can be deployed at a location close to the user terminal 40 in terms of physical distance.

For example, in FIG. 2, a calculation node 60A used by the user terminal 40A is deployed in the same region 4A as the user terminal 40A. Similarly, the user terminal 40B, the user terminal 40C, and the calculation node 60B used by the two user terminals 40B and 40C are deployed in the same region 4B. In this way, since the two user terminals 40B and 40C share the calculation node 60B in the same region 4B, idle time of an accelerator can be shortened and the utilization efficiency can be improved.

The center server 70 of FIG. 1 operates an accelerator included in the center server 70 itself. On the other hand, the center server 70 in FIG. 2 does not need to include an accelerator because of offloading to the calculation nodes 60A and 60B. As a result, the communication delay arising from a delay from the user terminal 40 to the center server 70 is shortened to a delay with respect to the calculation node 60 that is in the same region 4 as the user terminal 40. Thus, it is possible to provide a service requiring high real-time performance. Furthermore, since the data transmission distance is shortened, the data transfer cost can also be reduced.

In addition, since the user terminals 40A and 40B of FIG. 2 do not need to include an accelerator, even a smartphone that does not include an accelerator having high computation performance such as a GPU can operate an application requiring high computation performance such as a 3D graphical game.

Note that although the calculation node 60 is provided with an accelerator for executing a workload, an application for instructing an execution of the workload may not be installed.

Thus, since an operator for each of the regions 4 only needs to provide the calculation node 60 without knowing the contents of the application, the operation cost can be reduced. In addition, a developer of an application that operates on the center server 70 or the user terminal 40 can develop the application without being aware of the computer configuration of the accelerator in the calculation node 60 or the like.

Furthermore, an accelerator management mechanism 1 dynamically manages how to cause each user terminal 40 to use the accelerator of each calculation node 60. The accelerator management mechanism 1 dynamically prepares the accelerator of the calculation node 60 according to the frequent occurrence processing of the application, and allocates the workload of the frequent occurrence processing to the accelerator so as to increase the usage rate of the prepared accelerator.

Figure 3:
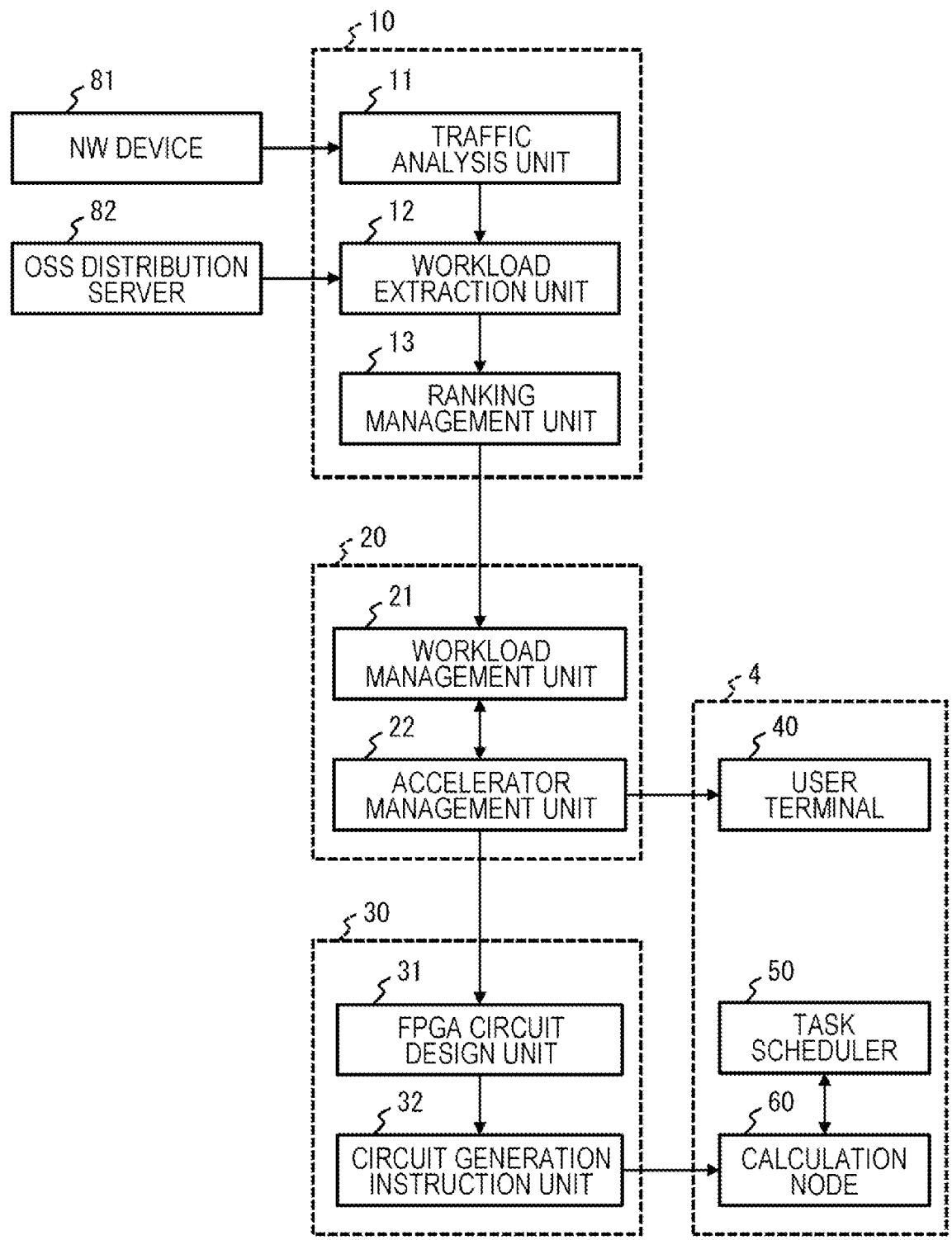
FIG. 3 is a configuration diagram illustrating details of an accelerator management mechanism according to an embodiment.

Therefore, the accelerator management mechanism 1 includes an analysis device (analysis unit) 10, a management device 20, and a command device (command unit) 30 (details are illustrated in FIG. 3). Each device constituting the accelerator management mechanism 1 may be housed in the same housing and configured as an accelerator management device.

FIG. 3 is a configuration diagram illustrating details of the accelerator management mechanism 1.

The analysis device 10 includes a traffic analysis unit 11, a workload extraction unit 12, and a ranking management unit 13.

The traffic analysis unit 11 extracts frequent occurrence processing from an application that operates in a user terminal 40 or a center server 70. In this extraction method, for example, traffic information (content of a packet) transferred by a network (NW) device 81 may be analyzed by deep packet inspection (DPI), or popular software ranking of an open source software (OSS) distribution server 82 may be referenced, and statistics of application programming interface (API) calls, which are frequently performed processing, may be acquired.

The workload extraction unit 12 extracts a workload to be allocated to an accelerator 63 from the frequent occurrence processing obtained by the traffic analysis unit 11.

The ranking management unit 13 creates ranking information of the workload extracted from the frequent occurrence processing.

The management device 20 includes a workload management unit 21 and an accelerator management unit 22.

The accelerator management unit 22 acquires a usage status of an accelerator in each calculation node 60 across a plurality of regions 4A and 4B.

The workload management unit 21 receives the ranking information of the workload from the ranking management unit 13, and associates the usage status of an accelerator acquired by the accelerator management unit 22 with the ranking information so that the workload for executing the frequent occurrence processing can be processed.

The command device 30 includes an FPGA circuit design unit 31 and a circuit generation instruction unit 32.

The FPGA circuit design unit 31 designs a circuit of an accelerator of which there is a shortage (hereinafter also referred to as an "additional circuit in shortage") from the current usage status of an accelerator according to the association from the workload management unit 21. That is, the FPGA circuit design unit 31 increases the number of circuits of an FPGA capable of supporting a workload as the ranking of the workload in the ranking information becomes higher and the execution frequency of the workload becomes higher.

The circuit generation instruction unit 32 instructs each calculation node 60 to issue a generation instruction for the additional circuit in shortage that has been designed by the FPGA circuit design unit 31. Similarly, the circuit generation instruction unit 32 instructs each calculation node 60 to issue a circuit initialization (deletion) instruction of a surplus accelerator.

Figure 4:
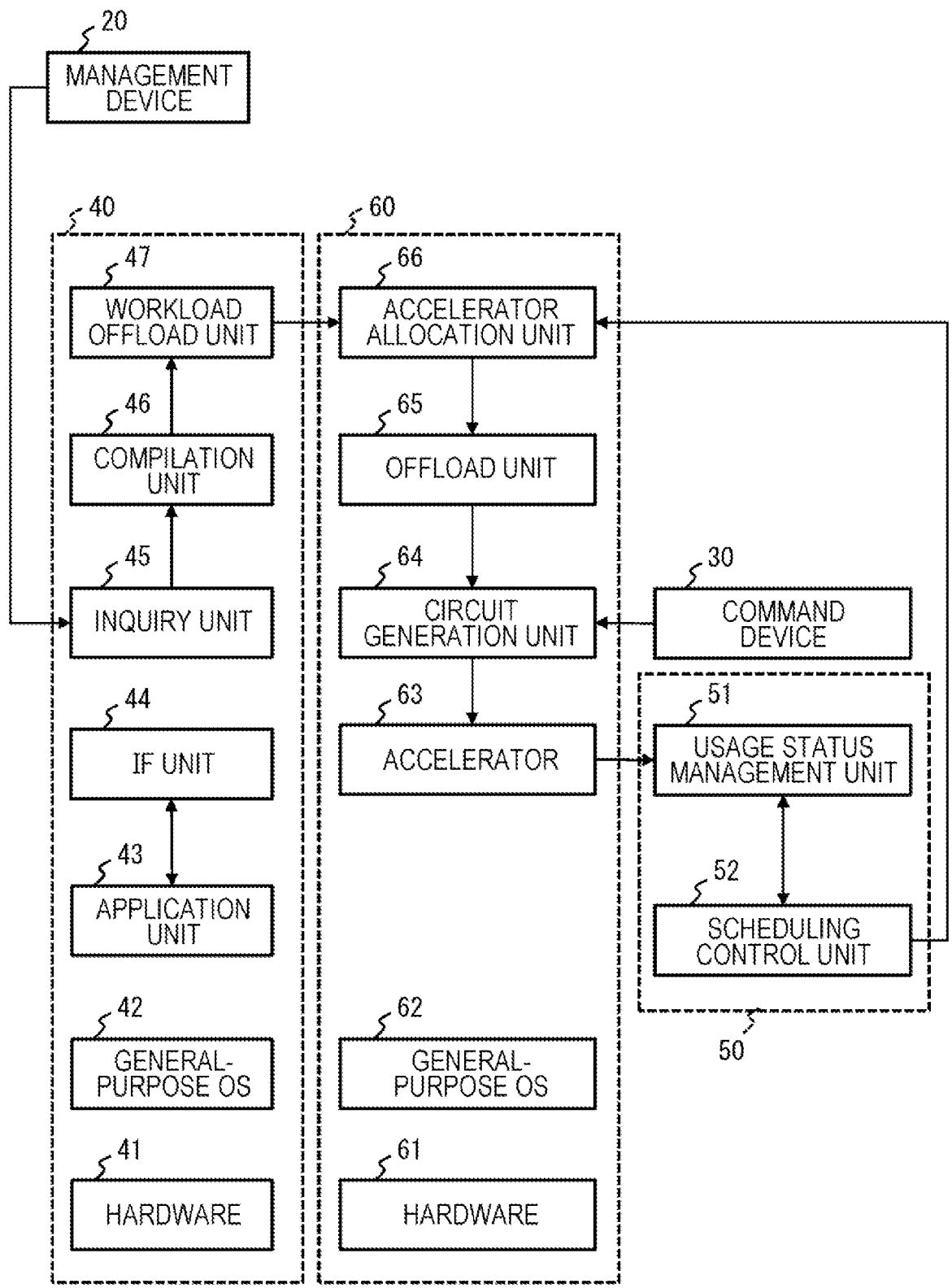
FIG. 4 is a configuration diagram illustrating details of a device used for each region according to an embodiment.

FIG. 4 is a configuration diagram illustrating details of a device used for each region 4.

Here, the region 4 is a range in which the user terminal 40 and the calculation node 60 deployed in the same region 4 are brought close to each other such that a communication delay between the user terminal 40 and the calculation node 60 is equal to or less than a predetermined value. For example, the range 4 is a range accommodated in the same prefecture, the same municipality, the same base station, or the like.

The user terminal 40 includes hardware 41, a general-purpose OS 42, an application unit 43, an IF unit 44, an inquiry unit 45, a compilation unit 46, and a workload offload unit 47. The hardware 41 (CPU or memory), the general-purpose OS 42, and the IF unit 44 of the user terminal 40 are configurations of a general computer.

Note that, similarly to the user terminal 40, the center server 70 offloads the workload to the accelerator 63 of the calculation node 60, and thus has the same configuration as the user terminal 40 (not illustrated).

The calculation node 60 includes hardware 61, a general-purpose OS 62, an accelerator 63, a circuit generation unit 64, an offload unit 65, and an accelerator allocation unit 66. The hardware 41 (CPU or memory) and the general-purpose OS 42 of the calculation node 60 are configurations of a general computer.

The user terminal 40 (or the center server 70) executes processing such as function calling to generate a workload that can be processed by an external accelerator. Then, the user terminal 40 inquires the management device 20 about an accelerator to be an offload destination of the workload.

Upon receiving the inquiry, the management device 20 prepares an accelerator 63 to be used by the user terminal 40 in the calculation node 60. Then, the management device 20 transmits, to the user terminal 40, a location and a usage method of the accelerator 63 to be used.

The user terminal 40 offloads the workload to the calculation node 60 with the accelerator 63 whose information has been transmitted. The calculation node 60 utilizes the accelerator 63 to process the offloaded workload at high speed.

A task scheduler 50 includes a usage status management unit 51 and a scheduling control unit 52. The task scheduler 50 performs scheduling so as to allow the accelerator 63 to switch between a plurality of workloads.

Figure 9:
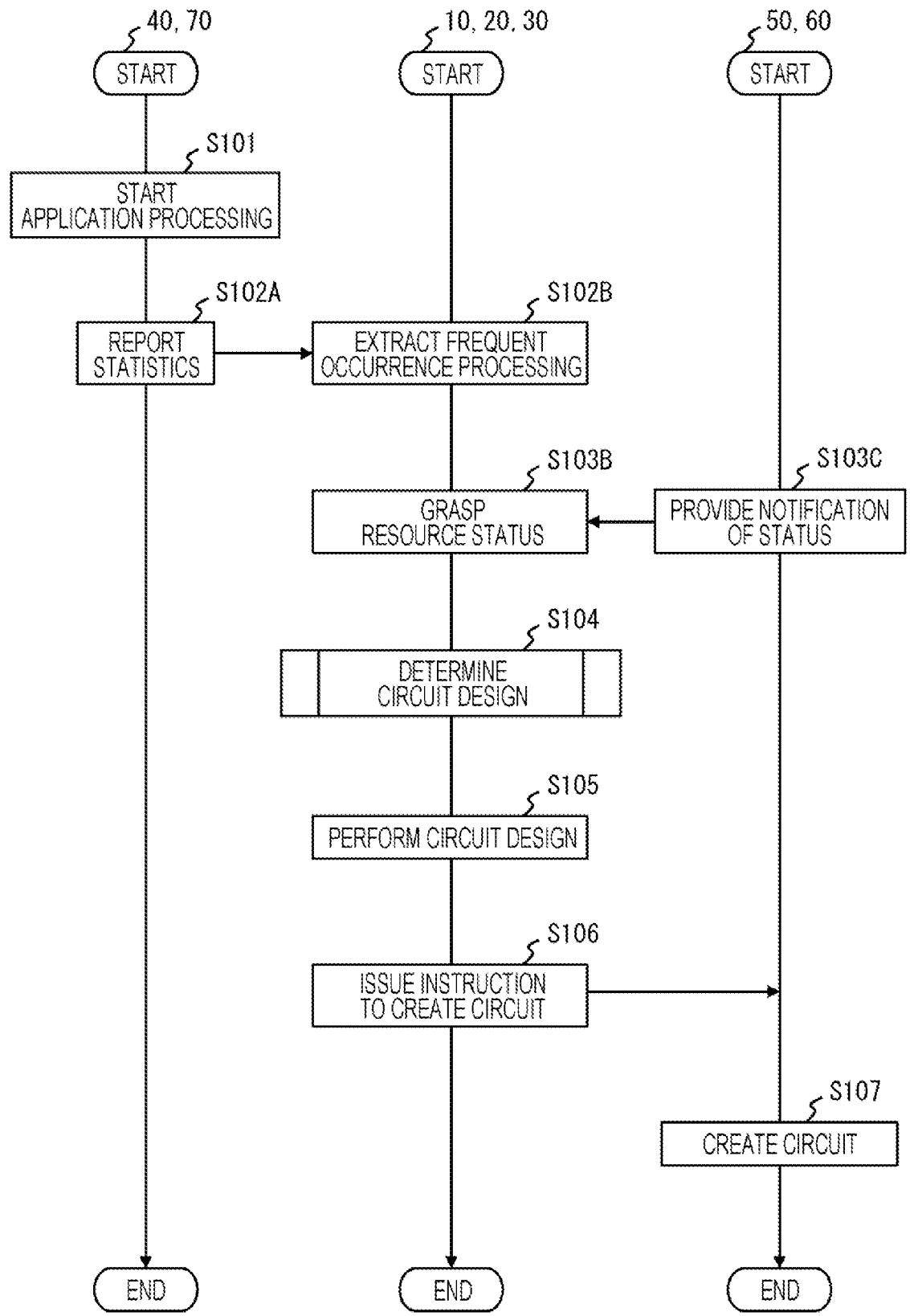
FIG. 9 is a sequence diagram illustrating processing in an accelerator preparation stage according to an embodiment.
Figure 10:
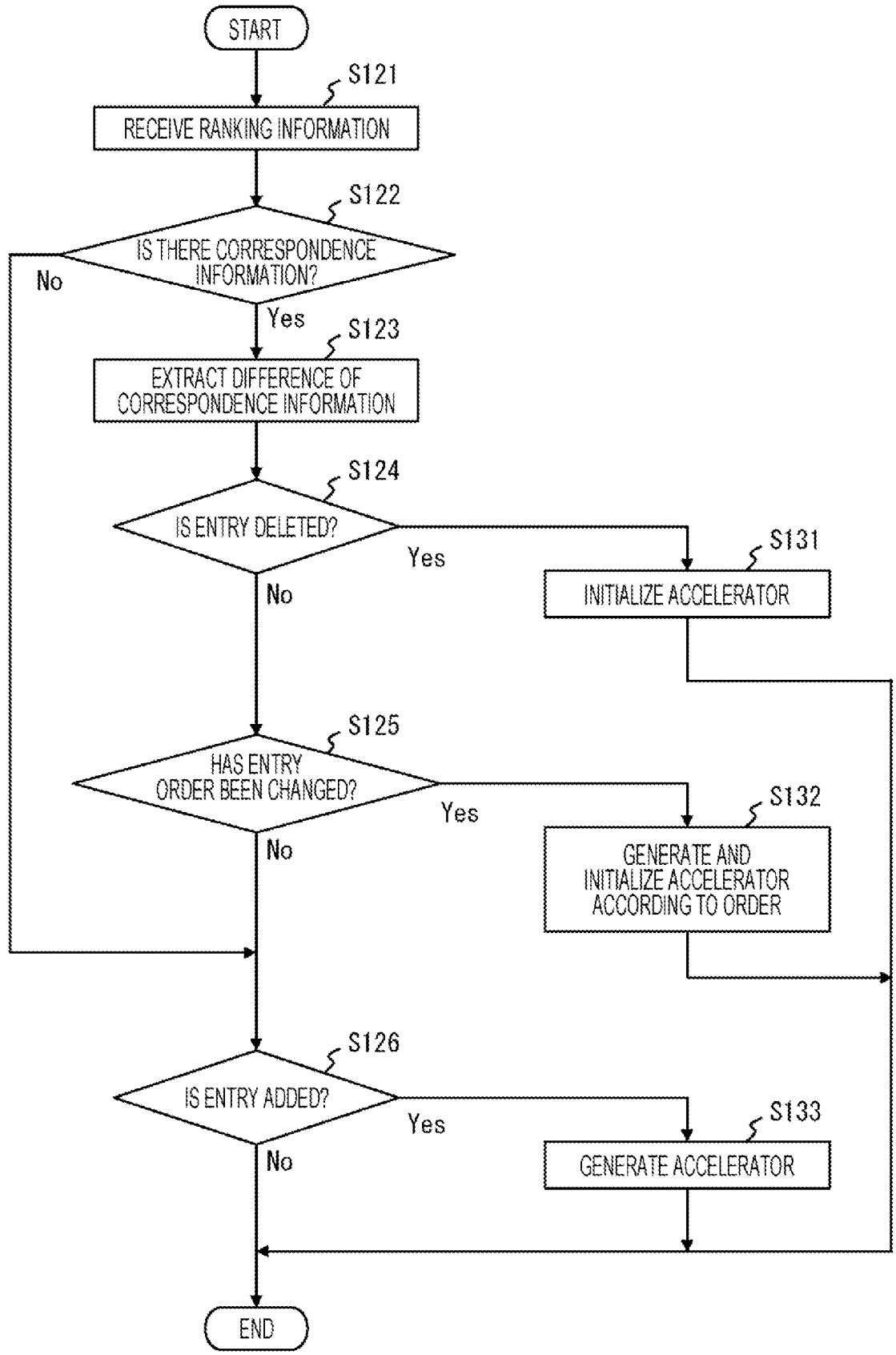
FIG. 10 is a flowchart illustrating details of circuit design determination processing according to an embodiment.
Figure 11:
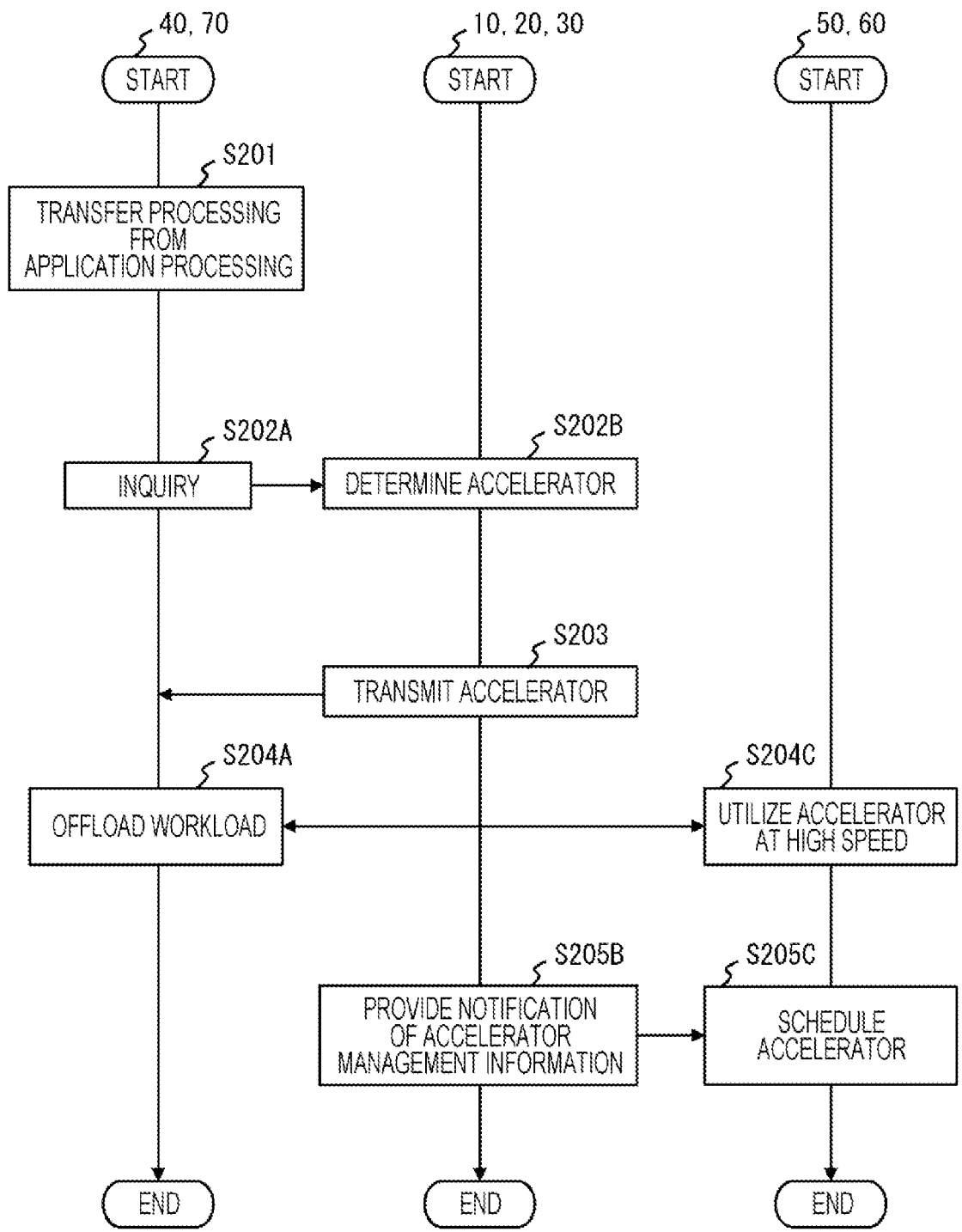
FIG. 11 is a sequence diagram illustrating processing in an accelerator utilization stage according to an embodiment.
Figure 12:
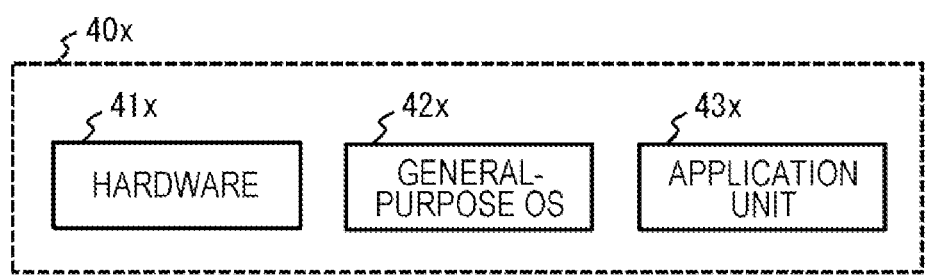
FIG. 12 is a configuration diagram illustrating a user terminal that does not include an accelerator.
Figure 13:
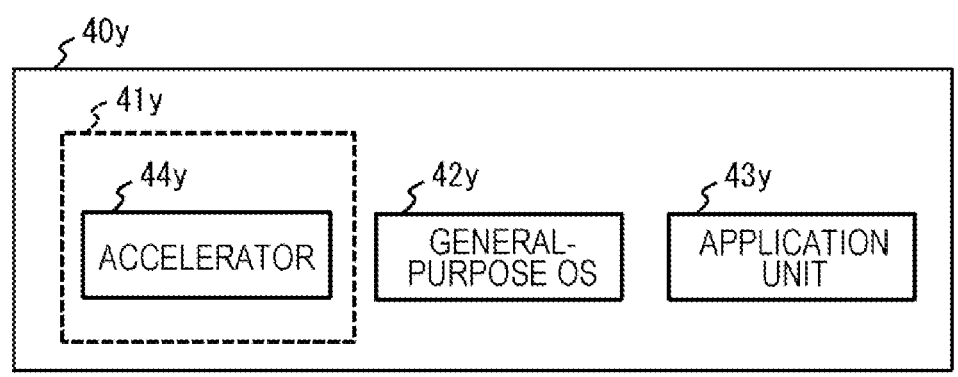
FIG. 13 is a configuration diagram illustrating a user terminal that includes a built-in accelerator.
Figure 14:
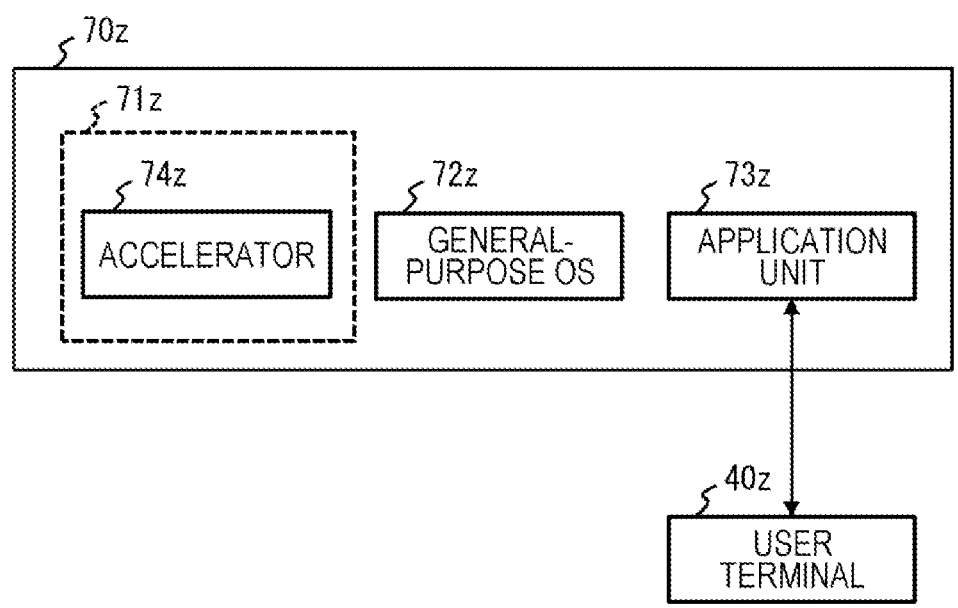
FIG. 14 is a configuration diagram illustrating a user terminal that requests a center server that includes an accelerator to perform processing.

Note that details of each processing unit in FIG. 4 will be clarified by the flowcharts in FIGS. 9 to 11.

Figure 5:
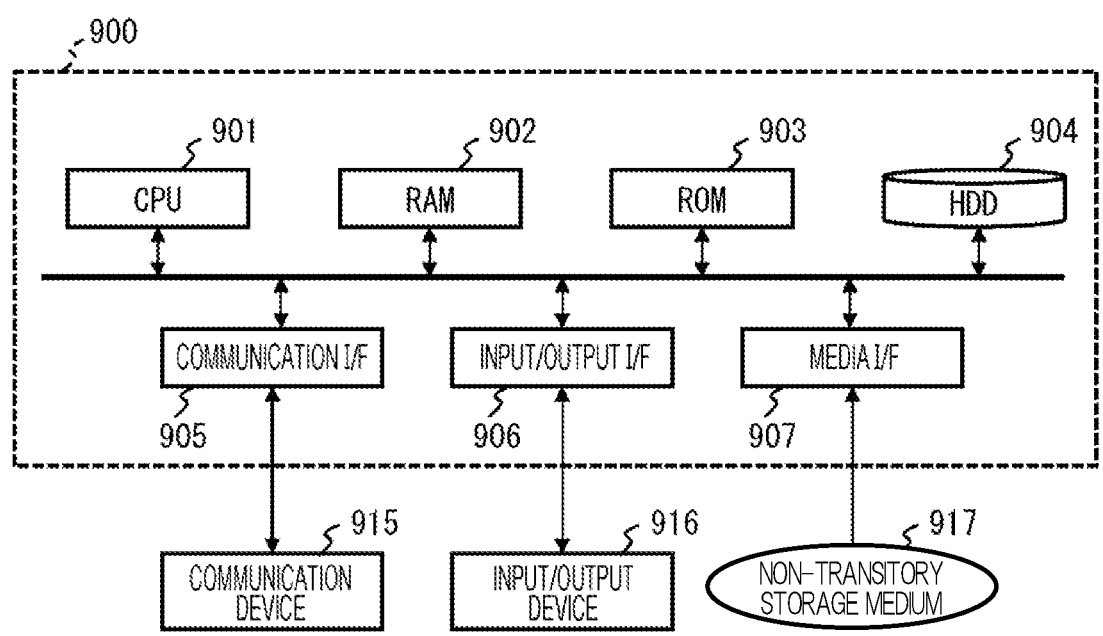
FIG. 5 is a hardware configuration diagram of each device in a communication system according to an embodiment.

FIG. 5 is a hardware configuration diagram of each device (including the accelerator management device described above) of the communication system 100.

Each device of the communication system 100 is configured as a computer 900 including a CPU 901, a RAM 902, a ROM 903, an HDD 904, a communication interface (I/F) 905, an input/output I/F 906, and a media I/F 907.

The communication I/F 905 is connected to an external communication device 915. The input/output I/F 906 is connected to an input/output device 916. The media I/F 907 reads and writes data from and to a non-transitory storage medium 917. Furthermore, the CPU 901 controls each processing unit by executing a program (such as the application unit 43, an accelerator management program provided in the accelerator management device, or the like) loaded into the RAM 902. The program can be distributed via a communication line or recorded in a non-transitory storage medium 917 such as a CD-ROM and distributed.

FIG. 6 is a table illustrating accelerator management information 220 managed by the accelerator management unit 22.

The accelerator management information 220 associates, for each accelerator, FPGA circuit information (processable workload), information (an IP address and a physical location indicated by latitude/longitude) of the calculation node 60 having the accelerator, an identifier of the accelerator, and a usage status (period) of the accelerator with each other.

FIG. 7 is a table illustrating workload ranking information 130 managed by the ranking management unit 13. The workload ranking information 130 may be created for each region 4. For example, the workload ranking information 130 of an urban region 4 has many specific workloads, the workload ranking information 130 of a suburban region 4 has many other workloads, and the workload ranking information 130 that is different for each region 4 is created.

The workload ranking information 130 associates, for each workload such as image edge detection, the number of cases of processing (100 cases) with the ranking (first place) of the number of cases of processing. Note that the same workload may be commonly used by a plurality of applications.

FIG. 8 is a table illustrating correspondence information 210, information on correspondence between the workload and the accelerator, that is managed by the workload management unit 21. The correspondence information 210 may also be created for each region 4.

In addition to including the columns (ranking, workload, and the number of cases) of the workload ranking information 130 of FIG. 7, the correspondence information 210 includes and associates the number of accelerator(s) that can execute a workload with the usage rate of the accelerator(s).

By ranking the workload and componentizing the corresponding accelerator in this way, a plurality of users can share an accelerator with a plurality of applications, and utilization efficiency (operating time) of the accelerator can also be increased.

In addition, by not allowing the accelerator to be used exclusively for one piece of application processing, it is possible to process workloads of various applications as fairly as possible when a company with high public nature such as a communication company operates the calculation node 60 in a regional data center (regional DC).

Note that various applications are greatly affected by a trend in which the number of users suddenly increases or decreases. Therefore, investing in a lot of hardware (accelerator) for an application in advance will carry a lot of risk for an operating company of that application.

Therefore, by newly providing an operator of the accelerator management mechanism 1 that fairly provides the accelerator of the calculation node 60 among the application vendor and the user, it is possible to achieve both convenience for the accelerator user and cost reduction for the accelerator vendor.

FIG. 9 is a sequence diagram illustrating processing in an accelerator preparation stage.

The application unit 43 of the user terminal 40 (or the center server 70) starts the processing of an application (S101). The user terminal 40 reports, to the analysis device 10, statistical information such as the number of times an application programming interface (API) has been called with the processing of the application (S102A).

Note that the API called in S102A is an API provided as a cloud service such as Amazon Web Services (AWS, registered trademark) or Google Web API (Google is a registered trademark). For example, the application unit 43 can acquire map information by calling the Google Geolocation API. The cloud service called from the API can also be said to be a microservice that is an external function from the viewpoint of the application unit 43.

The traffic analysis unit 11 of the analysis device 10 extracts frequent occurrence processing from each processing of the application of S101 by a method exemplified below (S102B).

Method of acquiring the number of times of calling an API local to the user terminal 40 that has been reported in S102A.

Method of analyzing traffic flowing through a NW device 81 between the user terminal 40 and the center server 70 by deep packet inspection (DPI) or the like.

Method of extracting popular software from the number of downloads of the OSS distribution server 82.

The workload extraction unit 12 of the analysis device 10 extracts a workload to be offloaded to an accelerator from the frequent occurrence processing extracted in S102B. Note that, low-frequency processing that does not correspond to the frequent occurrence processing is not a target of offloading, and the low-frequency processing is locally processed by the user terminal 40 or the center server 70 as described using FIG. 1. The ranking management unit 13 generates the workload ranking information 130 of FIG. 7 from the set of extracted workloads and sends the workload ranking information to the management device 20.

The accelerator management unit 22 of the management device 20 grasps the resource status in the communication system 100 described below from status notified (S103C) by each calculation node 60 regarding its own status (S103B), and writes the result as the accelerator management information 220 of FIG. 6.

An address of a calculation node 60, such as an IP address, a physical location of the calculation node 60, and an identifier of an accelerator 63 in the calculation node 60, as a location of a resource A type of the accelerator 63 (GPU/TPU/FPGA). Also, what kind of circuit is set in the case of FPGA.

Usage status of the accelerator 63

The workload management unit 21 of the management device 20 makes a determination on circuit design including whether to prepare a new accelerator on the basis of the workload ranking information 130 received from the analysis device 10 and the accelerator management information 220 of FIG. 6 (S104, details in FIG. 10).

The FPGA circuit design unit 31 of the command device 30 performs circuit design of an accelerator 63 (FPGA) of a calculation node 60 on the basis of the result of S104 (location/type of the accelerator to be generated or the like) (S105). When the accelerator type is a type other than the FPGA, the processing of S105 to S107 may be omitted, or processing of reserving an existing (fixed) accelerator 63 may be performed.

When the frequent occurrence processing is extracted from the DPI in S102B, a program source code for generating a circuit is described by the system operator. On the other hand, when the frequent occurrence processing is extracted from the download ranking of the OSS distribution server 82 in S102B, a program source code for generating the circuit can be acquired from the OSS distribution server 82.

Then, the circuit generation instruction unit 32 designates a program source code for generating the circuit and instructs the calculation node 60 to create the circuit (S106). The circuit generation unit 64 of the calculation node 60 that has received the instruction creates the circuit of the accelerator 63 according to the designated program source code (S107).

FIG. 10 is a flowchart illustrating details of circuit design determination processing (S104). By executing this flowchart, each accelerator 63 of each calculation node 60 is updated such that the workload ranking information 130 of FIG. 7 and the accelerator management information 220 of FIG. 6 are consistent with each other (that is, more accelerators 63 are allocated to a workload ranked higher).

Note that there is also a concern that the update processing becomes an overhead due to frequent update. Therefore, the execution frequency of the flowchart of FIG. 10 is appropriately tuned by an administrator or the like.

The workload management unit 21 receives the workload ranking information 130 from the ranking management unit 13 of the analysis device 10 (S121).

The workload management unit 21 determines whether or not there is the previously created correspondence information (FIG. 8, hereinafter referred to as the "correspondence information 210") on correspondence between the workload and accelerator (S122). If Yes in S122, the process proceeds to S123, and if No, the process proceeds to S126.

The workload management unit 21 compares the previously created correspondence information 210 with a current correspondence information 210, and extracts a difference between both entries (ranking of the workload) (S123).

When an entry existing in the previous ranking has been deleted this time (S124, Yes), the workload management unit 21 creates a free space in the accelerator 63 by initializing the accelerator 63 of the deleted entry (S131), and enables another workload to be executed.

In the case of No in S124, when there is an entry whose ranking order in the current ranking has been changed from the previous ranking (S125, Yes), the workload management unit 21 generates (adds) and initializes (deletes) accelerators 63 according to the changed order (S132).

That is, the workload management unit 21 prepares the number of accelerators 63 that is in accordance with the ranking order. For example, a workload whose ranking order has become higher than in the previous ranking will have the number of accelerators 63 for processing the workload increased. On the other hand, a workload whose ranking order has become lower than in the previous ranking will have the number of accelerator(s) 63 for processing the workload reduced.

In the case of No in S125, when an entry that does not exist in the previous ranking (or an entry for which a corresponding accelerator 63 has not yet been generated) has been added to the ranking this time (S126, Yes), the workload management unit 21 generates (increases) the accelerator 63 that processes the added entry (S133). In the case of No in S126, the process ends.

FIG. 11 is a sequence diagram illustrating processing in an accelerator utilization stage. This sequence diagram is executed after the processing of the preparation stage of FIG. 9.

The application unit 43 of the user terminal 40 calls a function determined in advance for calling the offload function, thereby transferring the processing to the workload offload unit 47 (S201). The determined function may be read by the application unit 43 in advance as a library of the workload offload unit 47 so as to be called according to a definition of the IF unit 44.

In S201, in a case where an accelerator corresponding to a service level agreement (SLA) such as a delay request of an application, a NW bandwidth request, or an availability request (an operation rate condition) is to be allocated, information on the SLA is also transmitted to the workload offload unit 47.

In one or more embodiments, an operator or the like of the communication system 100 publishes information such as a specification of the library of the workload offload unit 47, SLA information, or the kind of accelerator that is present on a portal site for developers or the like.

The inquiry unit 45 makes an inquiry to the management device 20 on which accelerator to use for the delegation of the process of S201 (S202A). The inquiry may include the SLA information transmitted in S201.

In response to the inquiry of S202A, the accelerator management unit 22 of the management device 20 obtains the availability of an accelerator suitable for the type of the workload from the accelerator management information 220 of FIG. 6, and determines the accelerator to be used (S202B).

At this time, when an SLA defines an upper limit to the communication delay, for example, the accelerator management unit 22 takes into consideration a condition such as the distance between the accelerator and the user terminal 40 using the accelerator must be short (in the same region 4). In addition, in a case where an accelerator corresponding to the SLA of the application is to be allocated, the accelerator management unit 22 may allocate an accelerator having performance that satisfies the SLA.

The accelerator management unit 22 reserves the location of the accelerator to be used as determined in S202B, and transmits the reservation result to the inquiry unit 45 (S203). The compilation unit 46 compiles the workload so that the processing delegated in S201 can be executed at the location of the accelerator transmitted in S203. The compiled workload includes an offloading instruction of the workload and a data body used by the workload to be processed.

The workload offload unit 47 requests the accelerator allocation unit 66 of a calculation node 60 to offload the compiled workload to the accelerator transmitted in S201 (S204A).

The offload unit 65 of the calculation node 60 utilizes its own accelerator 63 to perform an operation of the workload received by the accelerator allocation unit 66 at a higher speed than the user terminal 40 or the center server 70 (S204C).

Although the processing of offloading a workload from a user terminal 40 to a calculation node 60 has been described above, processing of offloading a workload from a center server 70 to a calculation node 60 can be similarly executed.

Below, a case where one accelerator 63 is shared by a plurality of applications to improve utilization efficiency will be described. Workloads to be offloaded are classified into the following two types.

(1) Batch processing whose start and end times can be predicted in advance. For this batch processing, an available accelerator 63 can be allocated from the accelerator management information 220 (in use or available) in FIG. 6 so as not to overlap with another workload.

(2) Streaming processing in which processing is resident once started like video processing of a monitoring camera. For this streaming processing, one workload occupies an accelerator 63. Therefore, the task scheduler 50 in the same region 4 as the user terminal 40 and the calculation node 60 performs scheduling so as to temporally multiplex the workload operating on one accelerator 63 and switch to and from the workload of the streaming processing.

As a specific process of scheduling, the accelerator management unit 22 of the management device 20 notifies the usage status management unit 51 of the task scheduler 50 of the accelerator management information 220 of FIG. 6 (S205B).

The scheduling control unit 52 acquires the accelerator management information 220 of FIG. 6 from the usage status management unit 51, and performs scheduling so as to temporally multiplex a plurality of workloads operating on one accelerator 63 by using a context switch function of a multi-task operating system or the like (S205C).

Effects

An accelerator management mechanism 1 (accelerator management device) according to an embodiment of the disclosure includes: a workload management unit 21 that is configured to manage correspondence information 210 that associates each workload with an accelerator 63 of a calculation node 60 that may support the workload; and an accelerator management unit 22 that is configured to receive an inquiry about a workload from a user terminal 40, acquire information of the accelerator 63 of the calculation node 60 that may support the workload of the inquiry with reference to the correspondence information 210, respond to the user terminal 40 with the acquired information, and thereby offload the workload of the inquiry from the user terminal 40 to the accelerator 63 of the calculation node 60 for which the response has been made.

Thus, by managing accelerators scattered in the network and allocating accelerators that are suitable for the workload, it is possible to increase the calculation efficiency (calculation speed and energy efficiency) of the application. Therefore, it is possible to provide an application that utilizes an accelerator even in a terminal with poor calculating capability. In addition, high availability can be provided even when an accelerator fails.

The accelerator management mechanism 1 according to an embodiment of the disclosure further includes a command device 30 (command unit), and when the accelerator 63 of the correspondence information 210 is an FPGA, the command device 30 is configured to generate a circuit of the FPGA that may support the workload on the calculation node 60.

Thus, by generating a circuit with high calculation efficiency suitable for the workload, the calculation efficiency of the application is increased.

The accelerator management mechanism 1 according to an embodiment of the disclosure further includes an analysis device 10 (analysis unit).

The analysis device 10 is configured to create a ranking of the workload according to an execution frequency of the workload on the basis of statistical information of the workload, and the command device 30 is configured to increase the number of circuits of an FPGA capable of supporting a workload as the execution frequency of the workload becomes higher.

Thus, a workload of the frequent occurrence processing is preferentially allocated an accelerator 63, and the calculation efficiency of the application is increased.

The accelerator management unit 22 according to an embodiment of the disclosure is configured to acquire information of an accelerator 63 on a calculation node 60 that is deployed in the same region 4 as the user terminal 40 as the calculation node 60 that may support the workload about which the inquiry has been made by the user terminal 40, and respond to the user terminal 40 with the acquired information.

Thus, the workload can be processed with a low delay, and the data transfer cost accompanying the execution of the workload can be reduced.

A communication system 100 according to an embodiment of the disclosure includes: the accelerator management mechanism 1; the user terminal 40; the calculation node 60; and a task scheduler 50.

The task scheduler 50 is configured to perform scheduling for the accelerator 63 on the calculation node 60 that is in the same region 4 as the task scheduler so as to temporally multiplex a plurality of workloads operating on one accelerator 63.

Thus, the operation rate of the accelerator is improved, so that the utilization efficiency of resources of the accelerator can be improved.

The communication system 100 according to an embodiment of the disclosure further includes a center server 70 that is configured to respond to a request from the user terminal 40.

The accelerator management unit 22 is configured to receive an inquiry about a workload from the center server 70, acquire information of the accelerator 63 of the calculation node 60 that may support the workload of the inquiry with reference to the correspondence information 210, respond to the center server 70 with the acquired information, and thereby offload the workload of the inquiry from the center server 70 to the accelerator 63 of the calculation node 60 for which the response has been made.

Thus, by offloading the workload from the center server 70 of the public cloud to the calculation node 60, not only can the load of the user terminal 40 be reduced but the load of the center server 70 can be reduced as well.

REFERENCE SIGNS LIST

1 Accelerator management mechanism (accelerator management device)
4 Region
10 Analysis device (analysis unit)
11 Traffic analysis unit 12 Workload extraction unit
13 Ranking management unit
20 Management device
21 Workload management unit
22 Accelerator management unit
30 Command device (command unit)
31 FPGA circuit design unit
32 Circuit generation instruction unit
40 User terminal
41 Hardware
42 General-purpose OS
43 Application unit
44 IF unit
45 Inquiry unit
46 Compilation unit
47 Workload offload unit
50 Task scheduler
51 Usage status management unit
52 Scheduling control unit
60 Calculation node
61 Hardware
62 General-purpose OS
63 Accelerator
64 Circuit generation unit
65 Offload unit
66 Accelerator allocation unit
70 Center server
81 NW device
82 OSS distribution server
100 Communication system
130 Workload ranking information
210 Correspondence information
220 Accelerator management information

The invention claimed is:

1. An accelerator management device, comprising a first processor, wherein the first processor is configured to:
   manage correspondence information that associates each workload with an accelerator of a calculation node that may support the workload;
   receive an inquiry about a workload from a user terminal, acquire information of the accelerator of the calculation node that may support the workload of the inquiry with reference to the correspondence information, respond to the user terminal with the acquired information, and thereby offload the workload of the inquiry from the user terminal to the accelerator of the calculation node for which the response has been made; and
   create a ranking of the workload according to an execution frequency of the workload based on the number of downloads of an application that offloads the workload as statistical information of the workload, and prepare the accelerator in a quantity in accordance with a ranking order of the created ranking.

2. The accelerator management device according to claim 1, wherein,
   when the accelerator of the correspondence information is a field-programmable gate array (FPGA), the first processor is configured to generate, on the calculation node, a circuit of the FPGA that may support the workload, so that the number of circuits of an FPGA capable of supporting a workload is increased as the execution frequency of the workload becomes higher.

3. The accelerator management device according to claim 1, wherein
   the first processor is configured to:
   acquire, as the calculation node that may support the workload about which the inquiry has been made by the user terminal, information of the accelerator on the calculation node that is deployed in the same region as the user terminal; and
   respond to the user terminal with the acquired information.

4. A communication system comprising: the accelerator management device according to claim 3, a user terminal, a calculation node, and a task scheduler, wherein
   the task scheduler includes a second processor that is configured to perform scheduling for the accelerator on the calculation node that is in the same region as the task scheduler so that a plurality of workloads that operate on one accelerator are multiplexed temporally.

5. The communication system according to claim 4, further comprising a center server configured to respond to a request from the user terminal, wherein
   the first processor of the accelerator management device is configured to:
   receive an inquiry about a workload from the center server, acquire information of the accelerator of the calculation node that may support the workload of the inquiry with reference to the correspondence information, respond to the center server with the acquired information, and thereby offload the workload of the inquiry from the center server to the accelerator of the calculation node for which the response has been made.

6. An accelerator management method performed by an accelerator management device including a workload management unit and an accelerator management unit, the accelerator management method comprising:
   managing correspondence information that associates each workload with an accelerator of a calculation node that may support the workload;
   receiving an inquiry about a workload from a user terminal, acquiring information of the accelerator of the calculation node that may support the workload of the inquiry with reference to the correspondence information, and responding to the user terminal with the acquired information, and thereby offloading the workload of the inquiry from the user terminal to the accelerator of the calculation node for which the response has been made; and
   creating a ranking of the workload according to an execution frequency of the workload based on the number of downloads of an application that offloads the workload as statistical information of the workload, and preparing the accelerator in a quantity in accordance with a ranking order of the created ranking.

7. A non-transitory processor-readable storage medium storing an accelerator management program causing a computer to perform operations comprising:
   managing correspondence information that associates each workload with an accelerator of a calculation node that may support the workload;
   receiving an inquiry about a workload from a user terminal, acquiring information of the accelerator of the calculation node that may support the workload of the inquiry with reference to the correspondence information, responding to the user terminal with the acquired information, and thereby offloading the workload of the inquiry from the user terminal to the accelerator of the calculation node for which the response has been made; and
   creating a ranking of the workload according to an execution frequency of the workload based on the number of downloads of an application that offloads the workload as statistical information of the workload, and preparing the accelerator in a quantity in accordance with a ranking order of the created ranking.

8. The non-transitory processor-readable storage medium of claim 7, further configured to cause the computer to perform an operation comprising:

generating, when the accelerator of the correspondence information is a field-programmable gate array (FPGA), a circuit of the FPGA that may support the workload on the calculation node, so that the number of circuits of an FPGA capable of supporting a workload is increased as the execution frequency of the workload becomes higher.

9. The non-transitory processor-readable storage medium of claim 7, further configured to cause the computer to perform operations comprising:

acquiring, as the calculation node that may support the workload about which the inquiry has been made by the user terminal, information of the accelerator on the calculation node that is deployed in the same region as the user terminal; and responding to the user terminal with the acquired information.

\* \* \* \* \*